(12) United States Patent
Jonte et al.

(10) Patent No.: US 11,182,731 B1
(45) Date of Patent: Nov. 23, 2021

(54) SYSTEM AND METHOD FOR GENERATING LOGISTICS PACKAGES

(71) Applicant: VuTrans Solutions LLC, Weatherby Lake, MO (US)

(72) Inventors: Josh Jonte, Zionsville, IN (US); Paul Schultz, St. Joseph, MO (US); Mark Hogan, Kansas City, MO (US)

(73) Assignee: VuTrans Solutions LLC, Weatherby Lake, MO (US)

( * ) Notice: Subject to any disclaimer, the term of this patent is extended or adjusted under 35 U.S.C. 154(b) by 254 days.

(21) Appl. No.: 16/034,103

(22) Filed: Jul. 12, 2018

Related U.S. Application Data

(60) Provisional application No. 62/532,171, filed on Jul. 13, 2017.

(51) Int. Cl.
*G06Q 10/08* (2012.01)
*G06Q 50/30* (2012.01)
*G06F 40/14* (2020.01)

(52) U.S. Cl.
CPC ......... *G06Q 10/0834* (2013.01); *G06F 40/14* (2020.01); *G06Q 50/30* (2013.01)

(58) Field of Classification Search
CPC ......... G06Q 10/0833; G06Q 10/06315; G06Q 10/08355; G06Q 10/047; G06Q 10/08; G06Q 10/063; G06Q 10/06398; G06Q 10/083; G06Q 10/0832; G06Q 50/28; G06Q 50/02; G06Q 50/30; G06Q 10/04; G06Q 10/06; G06Q 10/06312; G06Q 10/067; G06Q 10/08345; G06Q 10/0835; G06Q 10/087; G06Q 30/018; G06Q 30/0283; G06Q 40/125; G06Q 50/06; G06Q 10/06311; G06Q 10/063112; G06Q 10/063114; G06Q 10/063116; G06Q 10/06313; G06Q 10/06316;
(Continued)

(56) References Cited

U.S. PATENT DOCUMENTS

| 5,880,958 A | 3/1999 | Helms et al. |
| 7,249,087 B2 | 7/2007 | Sharp et al. |

(Continued)

OTHER PUBLICATIONS

"IANA unveils new website to streamline 'street interchanges'"; Jul. 8, 2016; Progressive Railroading; https://www.progressiverailroading.com/intermodal/article/IANA-unveils-new-website-to-streamline-street-interchanges--48741 (Year: 2016 ).*

(Continued)

*Primary Examiner* — Michael P Harrington
*Assistant Examiner* — Jorge G Del Toro-Ortega
(74) *Attorney, Agent, or Firm* — Fresh IP PLC; John R. Bednarz

(57) ABSTRACT

A system includes a memory and at least one processor to import data from a source, the data comprising a list of legs and a list of multi-leg truck loads (MTLs), each leg comprising a trip from an origin to a destination and each MTL comprising at least one leg, automatically generate an unapproved package comprising a sequence of MTLs selected and removed from the list of MTLs, store the unapproved package in a database, transmit the unapproved package to a client computing device for approval, and receive the approval of the unapproved package from the client computing device and store the unapproved package as an approved package in the database.

15 Claims, 8 Drawing Sheets

(58) Field of Classification Search
CPC ........... G06Q 10/0633; G06Q 10/0837; G06Q
10/0838; G06Q 20/102; G06Q 20/108;
G06Q 20/12; G06Q 20/3223; G06Q
30/016; G06Q 30/0266; G06Q 30/0267;
G06Q 30/0282; G06Q 30/0635; G06Q
30/08; G06Q 50/12; G06Q 50/265; G06Q
30/02; G06Q 10/10; G06Q 10/02; G06Q
10/109; G06Q 30/0251; G06Q 30/0273;
G06Q 99/00; G06Q 20/34; G06Q 20/384;
G06Q 20/387; G06Q 30/0226; G06Q
30/0603; G06Q 40/00; G06Q 50/01;
G06Q 10/0639; G06Q 10/20; G06Q
40/123; G06Q 10/0631; G06Q 10/06375;
G06Q 10/107; G06Q 30/0201; G06Q
30/0269; G06Q 30/0277; G06Q 30/04;
G06Q 30/0601; G06Q 30/0641; G06Q
40/04; G06Q 40/06; G06Q 90/20
See application file for complete search history.

(56) References Cited

U.S. PATENT DOCUMENTS

| | | | |
|---|---|---|---|
| 7,385,529 | B2 | 6/2008 | Hersh et al. |
| 7,698,204 | B2 | 4/2010 | Abendroth |
| 8,330,626 | B1 | 12/2012 | Adelson |
| 8,452,713 | B2 | 5/2013 | Stemple et al. |
| 9,082,144 | B2 | 7/2015 | Jones et al. |
| 9,571,983 | B1 | 2/2017 | Li et al. |
| 9,613,468 | B2 | 4/2017 | Davidson et al. |
| 9,691,091 | B2 | 6/2017 | Jones et al. |
| 9,778,049 | B2 | 10/2017 | Davidson |
| 9,799,149 | B2 | 10/2017 | Davidson |
| 2002/0065738 | A1* | 5/2002 | Riggs .................. G06Q 10/0833 705/334 |
| 2004/0102898 | A1* | 5/2004 | Yokota ................ G01C 21/3691 701/414 |
| 2006/0241822 | A1* | 10/2006 | Yadappanavar ............................ G06Q 10/06312 701/5 |
| 2008/0064420 | A1* | 3/2008 | Aldern .................... H04W 4/14 455/466 |
| 2008/0162241 | A1 | 7/2008 | Betancourt |
| 2009/0030770 | A1 | 1/2009 | Hersh et al. |
| 2009/0216600 | A1 | 8/2009 | Hill |
| 2012/0010803 | A1 | 1/2012 | Min et al. |
| 2013/0117142 | A1* | 5/2013 | Thompson ............. G06Q 50/28 705/26.3 |
| 2015/0161698 | A1 | 6/2015 | Jones et al. |
| 2016/0104111 | A1 | 4/2016 | Jones et al. |
| 2016/0335593 | A1 | 11/2016 | Clarke et al. |
| 2016/0379168 | A1* | 12/2016 | Foerster .......... G06Q 10/08355 705/7.16 |
| 2017/0046658 | A1 | 2/2017 | Jones et al. |
| 2018/0081374 | A1* | 3/2018 | Nimchuk ............... G06Q 10/02 |

OTHER PUBLICATIONS

FourKites: Real-time Freight Visibility & Orchestration for the Food & Beverages Industry, 2017, FourKites, Inc., 4 pgs.

\* cited by examiner

Reports

[Approved Packages]
[Unapproved Packages]
[All MTLs]
[Invalid MTLs]
[All Load Segments]

Load Segments with more than: [ ] hours of downtime. [View]

FIG. 7

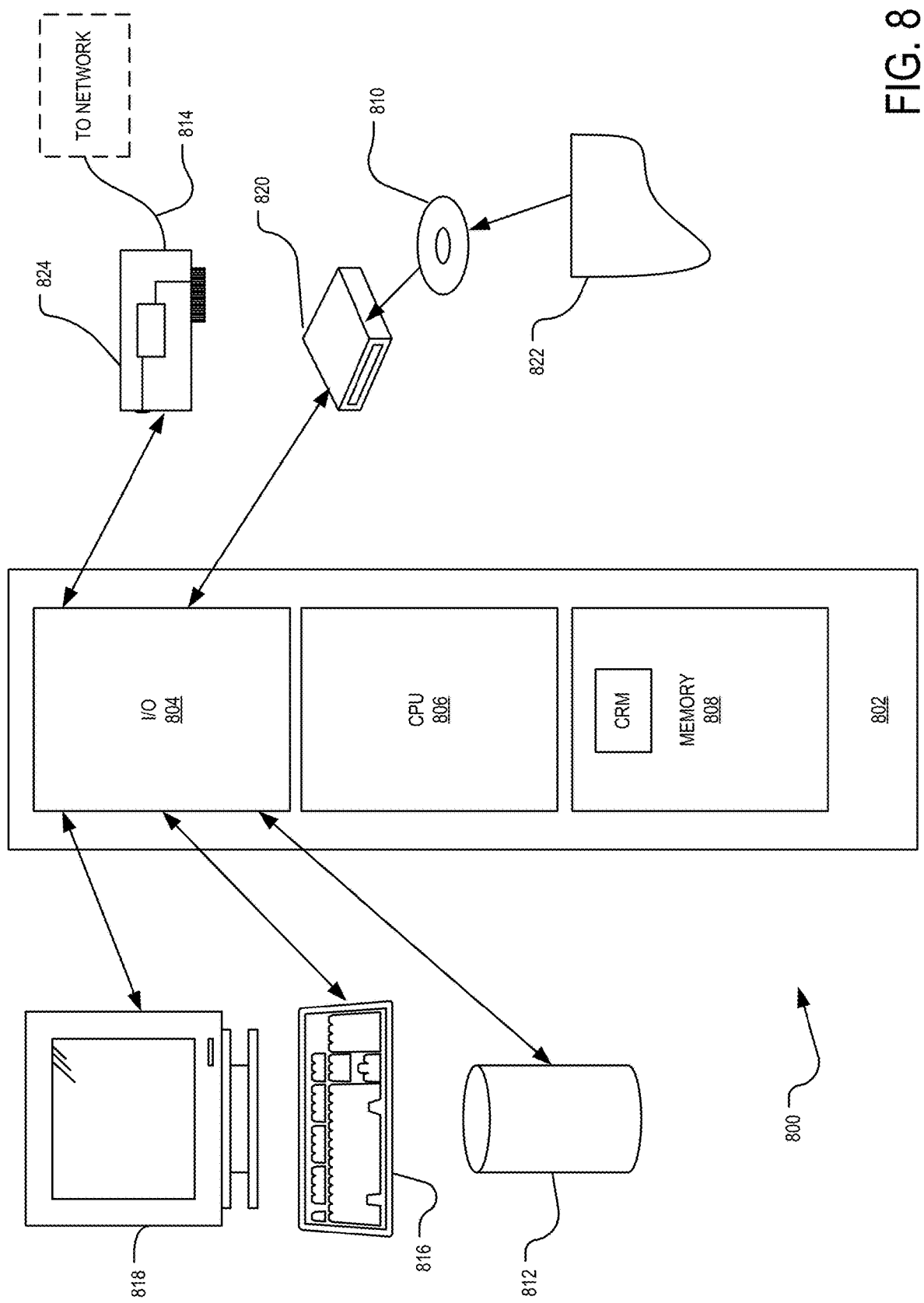

SYSTEM AND METHOD FOR GENERATING LOGISTICS PACKAGES

CROSS-REFERENCE TO RELATED APPLICATIONS

This application is related to and claims priority under 35 U.S.C. § 119(e) to U.S. Patent Application No. 62/532,171, filed Jul. 13, 2017, entitled "System and Method for Generating Logistics Packages," the entire contents of which are incorporated herein by reference.

BACKGROUND

More than fifty thousand Department of Transportation (DOT) licensed motor carrier trucking companies directly transport shipments of cargo over roads throughout the United States, between pick up origin locations and destination delivery locations, using trucks and other types of vehicles such as semi-tractor trailer rigs. There are also several thousand third party logistics companies (3PLs) who contract with motor carriers to arrange for the transport of property (freight/cargo) by motor carrier on behalf of hundreds of thousands of freight shippers and receivers, between numerous pick up origin locations and numerous delivery destination locations. Some of these locations are known as hubs.

Logistics companies have to meet the growing demand for efficient logistics transportation throughout the United States. In the process of transporting any shipment of cargo, a vehicle is required to travel from a first pick up origin location to one or more other locations to either pick up more cargo or to deliver all or portions of the cargo. Sometimes, the vehicle may have to return back to the first location. In most instances, in order for the driver(s) and vehicle to arrive at the first pick up origin location, a truck driver may have to travel with an empty trailer a particular distance to pick up cargo at the origin location. It is important for logistics companies to eliminate truck travel with empty trailers and optimize efficiencies. Additionally, it can be dangerous for trucks to travel with empty trailers, especially in areas with high winds or slick road surfaces.

Valuable logistics companies help their shipper clients and contracted motor carriers to measure and improve their operational efficiencies and target optimal efficiency in many ways which include, maximizing the percentage of revenue producing "loaded" miles traveled by truck drivers, minimizing the percentage of non-revenue producing "empty" miles traveled by truck drivers, and in other ways. It is important to recognize that humans are driving the trucks needed to fulfill the shipping requirements of on time pick up, transportation, and delivery. While trucks are designed to operate virtually twenty-four hours a day, truck drivers are limited by regulation. There is a longtime and chronic shortage of truck drivers in the United States. Some of the ways to improve this shortage include increasing job satisfaction by improving a driver's productivity in their job by minimizing unproductive waiting time. As an example, a driver can sit idling in their truck for hours and even days while they await their next pick up or delivery appointment. Drivers also have a strong desire for a healthy routine which includes adequate time for rest and for time to get off the road and be at home regularly. There are also other concerns.

Federal regulations limit the number of hours that any commercial motor vehicle driver can work in a specified time period. Therefore, effectively, these regulations limit the number of miles that a commercial truck driver can operate in a specified time period. A large percentage of truck drivers are compensated by the number of miles they drive and can find themselves tempted to travel as much as possible to earn as much as possible, but fatigued drivers are a serious and even fatal danger for both truck drivers and the general public.

It is with these issues in mind, among others, that various aspects of the disclosure were conceived.

SUMMARY

According to one aspect, a system for generating logistics packages is provided for combining a plurality of multi-leg truck loads (MTLs) together into a series of sequenced MTLs each having one or more legs for an operator or operators of a vehicle such as a tractor-trailer. A small number of MTLs having an open and non-limited time frame could possibly be handled manually. However, when the number of MTLs increases, the only way to produce a completed and optimal package solution within a specific time sensitive time frame is using the computerized system disclosed herein. In many MTLs there are a large number of variables and rules that are evaluated by the computerized system to determine a specific package solution. Each leg includes a trip by a motor carrier between two locations including an origin and a destination. Each MTL includes a plurality of sequenced legs. Each MTL may include a total number of miles, begin and end at a same location, and may include attributes of the legs included in the MTL. The MTLs may be evaluated, selected, sequenced, and then combined together into a package of MTLs.

There are a very large number of factors that the system automatically processes and evaluates against a plurality of rules. With the filtering options discussed herein, rules can be adjusted by a user for further automatic evaluation and selection by the system. As an example, factors can be associated with a type of freight being transported, a type of driver/operator operating the motor vehicle, service parameters of the freight, requirements of the loading origin and the unloading destination of the freight, roadways to be travelled during transportation of the freight, and others. Other factors may be associated with distances between a destination of one MTL and an origin of a next MTL, an amount of time between MTLs, leg attributes/requirements (e.g., chains required, tolls on roads, double trailers, and location specific requirements (e.g., such as whether or not the location requires Uniform Intermodal Interchange and Facilities Access Agreement (UIIA), Transportation Work Identification Credential (TWIC), pallet exchange, driver assist, tarp, drop trailer, security seals, and other logistics requirements)).

As an example, if the freight is perishable such as frozen foods, the system may mandate that only vehicles with an insulated and temperature control trailer be selected for evaluation. If it is determined that the freight is classified as "deep" frozen (e.g., below ten degrees Fahrenheit) for freight such as ice cream or other frozen foods, then the system may mandate that only "deep" frozen vehicles be selected for evaluation. As another example, certain types of freight may be classified by the USDOT as hazardous materials. In these cases, only certain drivers with a hazardous materials certification may be selected. The system may automatically apply rules to each of the factors associated with each MTL as it evaluates, selects, sequences, and then combines individual MTLs together into a package of MTLs.

In one example, the chains may be snow chains or tire chains that are attached to tires of the vehicle. If an MTL to be packaged includes a leg segment during the winter months where a state department of transportation may only allow trucks having tire chains for safety purposes, then the system may only select a motor carrier vehicle equipped with tire chains for the particular package.

According to an aspect, the system includes a memory and at least one processor to import data from a source, the data comprising a list of legs and a list of multi-leg truck loads (MTLs), each leg comprising a trip from an origin to a destination and each MTL comprising at least one leg, automatically generate an unapproved package comprising a sequence of MTLs selected and removed from the list of MTLs, store the unapproved package in a database, transmit the unapproved package to a client computing device for approval, and receive the approval of the unapproved package from the client computing device and store the unapproved package as an approved package in the database.

According to another aspect, a method includes importing, by a processor, data from a source, the data comprising a list of legs and a list of multi-leg truck loads (MTLs), each leg comprising a trip from an origin to a destination and each MTL comprising at least one leg, automatically generating, by the processor, an unapproved package comprising a sequence of MTLs selected and removed from the list of MTLs, storing, by the processor, the unapproved package in a database, transmitting, by the processor, the unapproved package to a client computing device for approval, and receiving, by the processor, the approval of the unapproved package from the client computing device and storing the unapproved package as an approved package in the database.

According to an additional aspect, a non-transitory computer-readable storage medium includes instructions stored thereon that, when executed by a computing device cause the computing device to perform operations, the operations including importing data from a source, the data comprising a list of legs and a list of multi-leg truck loads (MTLs), each leg comprising a trip from an origin to a destination and each MTL comprising at least one leg, automatically generating an unapproved package comprising a sequence of MTLs selected and removed from the list of MTLs, storing the unapproved package in a database, transmitting the unapproved package to a client computing device for approval, and receiving the approval of the unapproved package from the client computing device and storing the unapproved package as an approved package in the database.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 6 and 7 show example screenshots of a packager application of the system according to an example embodiment.

FIG. 8 illustrates a block diagram of a computing device according to an example embodiment.

DETAILED DESCRIPTION

Figure 1:
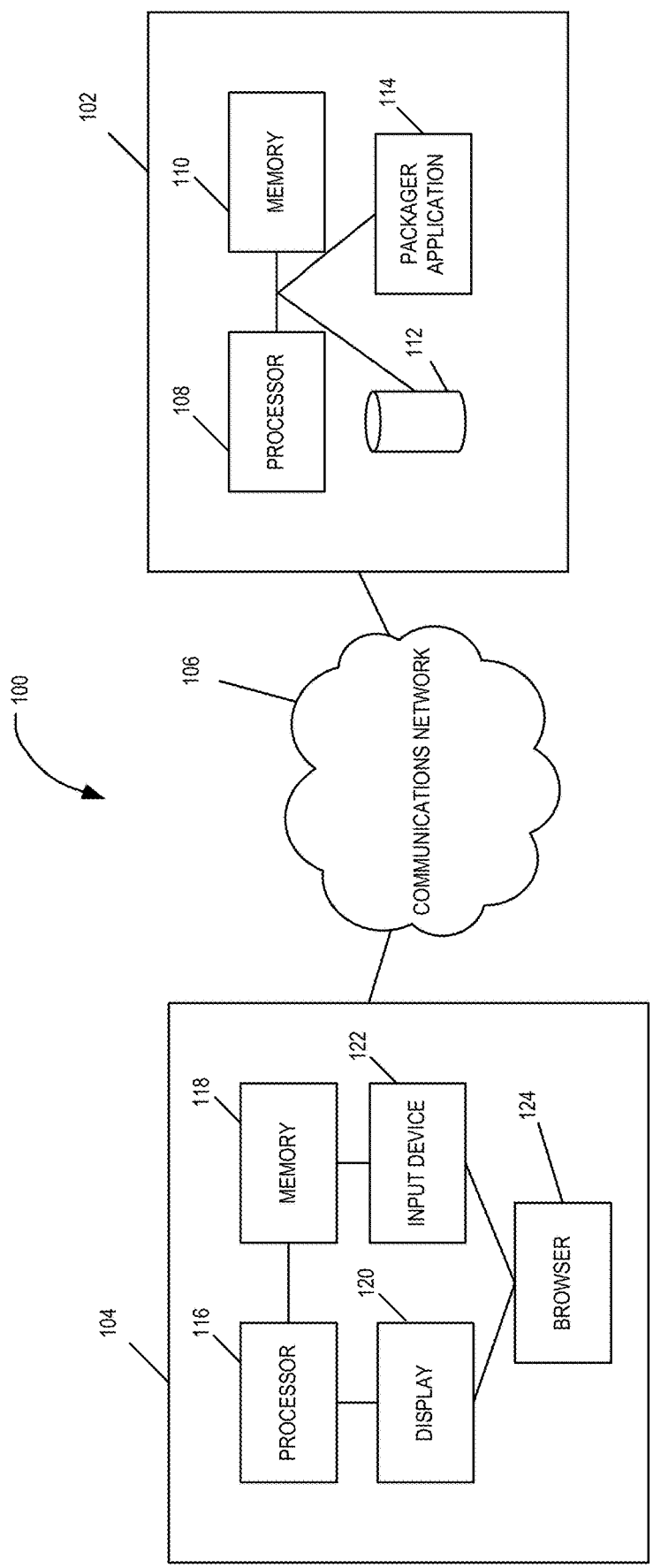
FIG. 1 is a block diagram of a system for generating logistics packages according to an example embodiment.

Aspects of a system and method for generating logistics packages provide a server computing device that automatically generates logistics packages for approval by a user using a client computing device. The "best" packages are packages generated by the system that provide vehicle operators with a consistent schedule and repeated destinations. This may allow the vehicle operators to learn a routine and maintain the routine throughout the package. The system may apply a number of rules or factors to combine a number of MTLs together into a sequence that is fulfillable by the vehicle operators. Each MTL may be selected from a pool of unassigned MTLs and added to a package as a next best MTL that is best suited for the package. The next best MTL may be an MTL that has an origin that is closest to a previous MTL's destination. In addition, the next best MTL may provide the vehicle operator with an appropriate amount of rest after the previous MTL. Additionally, the next best MTL may be selected based on other factors such as operator team size for one or more legs of the MTL, whether chains are required for one or more legs of the MTL, whether there are tolls associated with one or more legs of the MTL, whether there are double trailers for one or more legs of the MTL, and whether the MTL is associated with UIIA, and other factors. If there is more than one MTL that could be selected as the next MTL for the package, then the MTL with a start time closest to the end time of the previous MTL may be selected. If, based on the rules, there are no possible MTLs, then the package is complete. If the completed package does not include a minimum number of miles, then the MTLs in the package may be released to the pool of unassigned (unpackaged/stand-alone) MTLs. In one example, the factors and rules may be assigned by a user of the system. The factors and rules also may be based on Department of Transportation (DOT) rules, regulations, and requirements associated with down time, driving hours, and reset hours.

The system may determine a mileage between various leg segment origins and destinations via a lookup in a table stored in a database. The table may include mileages and roadway routing information between every zip code in the United States. In addition to determining the mileage, the system may apply another rule to prioritize the best MTL based on a number of miles from one MTL destination to another MTL origin. The system also may automatically determine a time of transit based on another rule associated with time of transit. The time of transit may be determined by the system based on a number of variables such as local, county, state, and federal highway speed limits along roadways associated with the route. As an example, the system may multiply a time of travel by the average speed limits along the roadways associated with the route to determine an estimated time of transit. Some packages may include tens of thousands of MTLs that may be created, edited, cancelled, and replaced within a very narrow time frame. Thus, the system that automatically generates logistics packages provides a distinctive way to provide a solution within the very narrow time frame. It is impossible to generate the logistics package by hand and it must be performed by the system that includes one or more computing devices.

As another example, one rule may be associated with selecting vehicles operated by a team due to an urgency of a shipment's required delivery date and time. Each driver may be limited by the DOT by the number of hours of operation in a twenty-four hour period. Thus, a motor vehicle driven/operated by two drivers may together drive/operate a motor vehicle as much as twice as many miles as a single driver. The system may automatically evaluate numerous factors of a plurality of MTLs and apply the rules as it selects MTLs best suited to be packaged together into a package.

The server computing device includes memory and at least one processor to import data from a source, the data comprising a list of legs and a list of multi-leg truck loads (MTLs), each leg comprising a trip from an origin to a destination and each MTL comprising at least one leg, automatically generate an unapproved package comprising a sequence of MTLs selected and removed from the list of MTLs, store the unapproved package in a database, transmit the unapproved package to a client computing device for approval, and receive the approval of the unapproved package from the client computing device and store the unapproved package as an approved package in the database.

As an example, a logistics company such as a third-party logistics (3PL) company may arrange for the transportation of property by motor carrier from a first location to a second location on behalf of another company. The motor carriers provide transportation, drivers, equipment, etc. It is important for the 3PL companies to eliminate travel with empty trailers as much as possible and optimize efficiencies. The 3PL company may have to arrange for the transportation of the freight from the first location to the second location. However, it is not desirable for the drivers to travel from the second location back to the first location with an empty trailer. The system and method described herein generates logistics packages of multi-leg truck loads (MTLs) of a series of sequenced legs of travel between destinations. The logistics packages are designed to have a consistent schedule that balances travel (e.g., driving) and downtime. The packages allow drivers to travel between destinations and eliminate travel with empty trailers, providing financial and environmental benefits, among other benefits.

The various concepts described herein involve one or more computing devices that provide a server computing device that receives raw data including a list of trips or runs between destinations, e.g., fixed-width files with the lists of trips, and automatically generates logistics packages. Each package includes a sequence of MTLs and each MTL in the sequence includes one or more sequenced legs to be driven by one or more drivers/operators. The logistics packages are based on a number of rules or factors that eliminate and curtail travel with empty trailers. In addition, the logistics packages provide work and rest for operators and provide a consistent schedule for the operators.

As an example, the system for generating logistics packages imports data from a source. The data may include a plurality of legs, e.g., a trip by a motor carrier between two locations including an origin and a destination. The plurality of legs may be stored in a database. The data also may include a plurality of MTLs, each MTL including one or more legs. The plurality of MTLs may be stored in the database.

The system may also include an auto packager that automatically generates a package that may include one or more sequences of MTLs. Each MTL includes a total number of miles, an origin, and a destination. In many instances, the origin and the destination of an MTL is the same. Each of the MTLs includes one or more legs of travel between destinations. Each package may be stored as an unapproved package in the database for approval and/or review by a user. The auto packager may use at least one rule or factor to generate the package such as a minimum number of miles for the package, a maximum number of miles between an MTL destination and a next MTL origin, a minimum number of hours between an end of an MTL and a start of a next MTL, and a maximum number of hours between an end of an MTL and a start of a next MTL. In addition, the rule or factor may be associated with driver/operator team preferences (e.g., only solo operator, only team operator, or no team preference), double trailer preferences (e.g., only double trailers, no double trailers, no trailer preference), chain preferences (e.g., no chain MTLs, only chain MTLs, no chain preference), and Uniform Intermodal Interchange and Facilities Access Agreement (UIIA) preferences (e.g., no UIIA MTLs, only UIIA MTLs, or no UIIA preferences) and other rules/factors.

The system may further include an approver that includes a web application that allows the user to approve the automatically generated unapproved packages of MTLs. Approved packages may be stored in the database. The system may further include an exporter that includes a web application that allows the user to export one or more approved packages to an output format such as a hypertext markup language (HTML) table, a CSV (comma-separated values) file, or another format.

FIG. 1 shows a block diagram of a computing system comprising a logistics packager system 100 according to an example embodiment. The logistics packager system 100 automatically generates logistics packages for review by a user.

The logistics packager system 100 includes at least one server computing device 102 having a packager application 114 that is in communication with at least one client computing device 104 via a communication network 106. The logistics packager system 100 may also include a relational database management system (RDBMS) or another type of database management system that stores and communicates data from at least one database 112. The data stored in the at least one database 112 may be logistics information including location information (e.g., a table of locations including location identifiers, latitudes, longitudes, city names, state abbreviations, postal codes, and other information), leg information (e.g., a list of trips or legs between two locations), multi-leg truck load (MTL) information (e.g., a list of MTLs including MTLs assigned to packages and MTLs not assigned to packages), and package information (e.g., unapproved packages and approved packages including one or more MTLs in a sequence), among other data.

The at least one server computing device 102 is configured to receive data from and/or transmit data to the at least one client computing device 104 through the communication network 106. Although the at least one server computing device 102 is shown as a single server, it is contemplated that the at least one server computing device 102 may include multiple servers, for example, in a cloud computing configuration. Additionally, the at least one server computing device 102 is configured to receive data and/or transmit data to the at least one client computing device 104 through the communication network 106.

The communication network 106 can be the Internet, an intranet, or another wired or wireless communication network. For example, the communication network 110 may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, or an IEEE 802.11 standards network, as well as various communications thereof. Other conventional and/or later developed wired and wireless networks may also be used.

The at least one server computing device 102 includes at least one processor 108 to process data and memory 110 to store data. The processor 108 processes communications, builds communications, retrieves data from memory 110, and stores data to memory 110. The processor 108 and the memory 110 are hardware. The memory 110 may include volatile and/or non-volatile memory, e.g., a computer-readable storage medium such as a cache, random access memory (RAM), read only memory (ROM), flash memory, or other memory to store data and/or computer-readable executable instructions such as a portion or component of the packager application 114. In addition, the at least one server computing device 102 further includes at least one communications interface to transmit and receive communications, messages, and/or signals.

The at least one client computing device 104 includes at least one processor 116 to process data and memory 118 to store data. The processor 116 processes communications, builds communications, retrieves data from memory 118, and stores data to memory 118. The processor 116 and the memory 118 are hardware. The memory 118 may include volatile and/or non-volatile memory, e.g., a computer-readable storage medium such as a cache, random access memory (RAM), read only memory (ROM), flash memory, or other memory to store data and/or computer-readable executable instructions such as a portion or a component of the packager application 114 displayed and executed by a browser 124. In addition, the at least one client computing device 104 further includes at least one communications interface to transmit and receive communications, messages, and/or signals.

The at least one client computing device 104 can be a laptop computer, a smartphone, a personal digital assistant, a tablet computer, a standard personal computer, or another processing device. The at least one client computing device 104 may include a display 120, such as a computer monitor, for displaying data and/or graphical user interfaces. The at least one client computing device 104 may also include an input device 122, such as a camera, a keyboard or a pointing device (e.g., a mouse, trackball, pen, or touch screen) to enter data into or interact with graphical and/or other types of user interfaces. In an exemplary embodiment, the display 120 and the input device 122 may be incorporated together as a touch screen of the smartphone or tablet computer.

The at least one client computing device 104 may display on the display 120 a graphical user interface (or GUI) application to generate a graphical user interface on the display 120. The graphical user interface may be provided by the browser 124 and the packager application 114, which may be transmitted from the server computing device 102. The graphical user interface enables a user of the at least one client computing device 104 to interact with the at least one server computing device 102 and the packager application 114.

The packager application 114 may be a component of an application and/or service executable by the at least one client computing device 104 and/or the at least one server computing device 102. For example, the packager application 114 may be a single unit of deployable executable code or a plurality of units of deployable executable code. According to one aspect, the packager application 114 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

Figure 2:
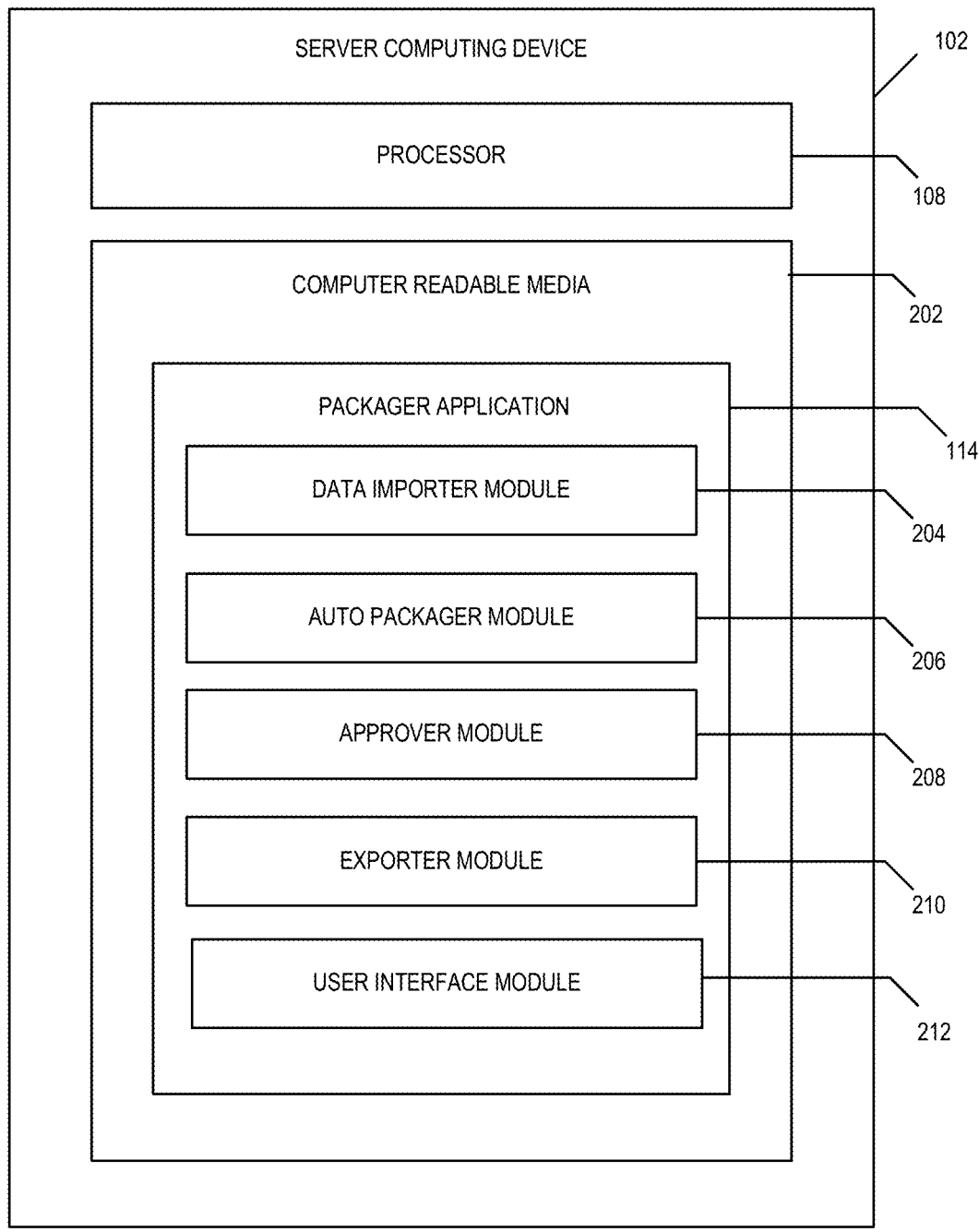
FIG. 2 shows a block diagram of a server computing device of the system according to an example embodiment.

FIG. 2 illustrates a block diagram of the server computing device 102 according to an example embodiment. The server computing device 102 includes computer readable media (CRM) 202 in memory on which the packager application 114 or other user interface or application is stored. The computer readable media may include volatile media, non-volatile media, removable media, non-removable media, and/or another available medium that can be accessed by the processor 108. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The packager application 114 includes a data importer module 204 for importing information about legs and MTLs from a data source. In one example, the data source may be a fixed-width file that includes leg information and MTL information. The data importer module 204 may create database rows in the database 112 in tables of the database 112 such as a leg table that includes a list of legs, an MTL table that includes a list of MTLs, and a location table that includes a list of locations.

In one example, the data importer module 204 may be an application or module that executes from a command line and may determine whether there are one or more files in a particular directory. The data importer module 204 may process all files in the particular directory. The data importer module 204 may iterate over each newly created leg record stored in the leg table and determine whether the origin and the destination of the leg are known locations, e.g., the location exists in the location table. If the location is unknown, the data importer module 204 may create a new row in the location table for the unknown location. The data importer module 204 may determine a latitude and a longitude for the unknown location by obtaining the latitude and longitude from a file that includes latitudes, longitudes, and associated location information, or from another source such as a server that provides location information.

In addition, the data importer module 204 may import information associated with each leg and store the information in the database 112 including a start time, an end time, a leg identifier, an associated MTL identifier for the leg, chain requirements for the leg, UIIA requirements for the leg, total time for the leg, driving time for the leg, down hours for the leg, and team requirements for the leg, among other information.

In addition, after creating the records in the leg table, the data importer module 204 may populate the MTL table to include information associated with legs assigned to each MTL. In addition, the MTL table may store information such as total hours for the MTL, driving hours for the MTL, down hours for the MTL, total miles for the MTL, if any of the legs for the MTL require a double trailer, if any of the legs require UIIA, if any of the legs require chains, and if any of the legs require more than one driver/operator.

After the data is imported, the data importer module 204 may perform validation on the imported MTLs and determine whether MTLs are invalid and cannot be selected by the auto packager module 206. As an example, the data importer module 204 may determine that an MTL is unbalanced if a distance between the origin and destination exceed thirty-five miles, may determine that an MTL has a sequence continuity error if the MTL contains legs with sequence identifiers that are not sequential, and may determine that an MTL has a time continuity error if the MTL contains legs having end times that are after a previous MTL start time.

The packager application 114 further includes an auto packager module 206 for automatically generating logistics packages and for combining a plurality of MTLs together into a series of sequenced MTLs. The auto packager module 206 creates each package from a pool of unassigned MTLs by iteratively applying one or more rules or factors to the unassigned MTLs and selecting from the unassigned MTLs. The rules or factors may be associated with (1) a number of total miles for the package, (2) a distance between a destination of a first MTL and an origin of a second MTL, (3) an amount of time between the first MTL and the second MTL, (4) team preferences, (5) double trailer preferences, (6) chain preferences, (7) UIIA preferences, and other rules/factors.

There are a very large number of factors that the system automatically processes and evaluates against a plurality of rules. With the filtering options discussed herein, rules can be adjusted by a user for further automatic evaluation and selection by the system. As an example, factors can be associated with a type of freight being transported, a type of driver/operator operating the motor vehicle, service parameters of the freight, requirements of the loading origin and the unloading destination of the freight, roadways to be travelled during transportation of the freight, and others. Other factors may be associated with distances between a destination of one MTL and an origin of a next MTL, an amount of time between MTLs, leg attributes/requirements (e.g., chains required, tolls on roads, double trailers, and location specific requirements (e.g., such as whether or not the location requires Uniform Intermodal Interchange and Facilities Access Agreement (UIIA), Transportation Work Identification Credential (TWIC), pallet exchange, driver assist, tarp, drop trailer, security seals, and other logistics requirements)). As an example, if the freight is perishable such as frozen foods, the system may mandate that only vehicles with an insulated and temperature control trailer be selected for evaluation. If it is determined that the freight is classified as "deep" frozen, (e.g., below ten degrees Fahrenheit) for freight such as ice cream or other frozen foods, then the system may mandate that only "deep" frozen vehicles be selected for evaluation. As another example, certain types of freight may be classified by the USDOT as hazardous materials. In these cases, only certain drivers with a hazardous materials certification may be selected. The system may automatically apply rules to each of the factors associated with each MTL as it evaluates, selects, sequences, and then combines individual MTLs together into a package of MTLs. If an MTL to be packaged includes a leg segment during the winter months where a state department of transportation may only allow trucks having tire chains for safety purposes, then the system may only select a motor carrier vehicle equipped with tire chains for the particular package.

Each MTL to be added to the package by the auto packager module 206 may be selected from a pool of unassigned MTLs in the database 112 and added to a package as a next best MTL that is best suited for the package. The next best MTL may be an MTL that has an origin that is closest to a previous MTL's destination. In other words, the next best MTL may best reduce a number of empty (no freight revenue) miles traveled by the motor vehicle between one MTL and another MTL. Reducing empty miles conserves fuel and provides environmental benefits. In addition, the next best MTL may provide the vehicle operator with an appropriate amount of rest after the previous MTL. Rested operators are safer operators. Additionally, the next best MTL may be selected based on other factors such as operator team size (one/solo operator or two/team operators), whether chains are required for the MTL, whether there are tolls associated with the MTL, whether there are double trailers for the MTL, and whether the MTL requires the motor carrier to be registered with the UIIA. If there is more than one MTL that could be the next MTL selected by the auto packager module 206, then the MTL with a start time closest to the end time of the previous MTL may be selected. As the auto packager module 206 selects a next MTL, the auto packager module 206 may first apply the most restrictive filtering rules and factors and may gradually loosen the filtering rules and factors to increase the likelihood of selecting the next MTL.

If there are no possible MTLs for selection based on the rules and factors, then the package is complete. If the completed package generated by the auto packager module 206 does not include a minimum number of miles, then the MTLs in the package may be released to the pool of unassigned MTLs. In one example, the factors and rules may be assigned by a user of the system. The factors and rules also may be based on Department of Transportation (DOT) rules, regulations, and requirements associated with down time, driving hours, and reset hours.

An example of pseudocode executed by the auto packager module 206 may be similar to the following:
Establish the filtering bands that determines the minimum, maximum, and exact matched
MTLs that occur in that filter. This is how the system determines the next best MTL. These
criteria start out as MOST ideal and work their way down to minimally acceptable.
the minimum miles per package
min_miles_per_package bands=[15000, 10000, 8000, 5000, 2500, 1]
the maximum distance from the origin the module will look for potential next MTLs
distance_from_origin_bands=[35, 50, 100]
the maximum hours between MTLs the module will allow
max_hours_between_mtl_bands=[24, 48, 96, 9999]
these are MTL feature filters. A given MTL can be a team, a pup trailer, use chains, or require
UIIA. The packager ideally groups MTLs with identical features together.

```
teams_bands=['exclude', 'only', 'include']
pups_bands=['only', 'exclude']
chains_bands=['only', 'exclude', 'include']
uiia_bands=['only', 'exclude', 'include']
# Apply the maximum distance from the mileage filters to
the MTLs.
for min_miles_per_package_band in min_miles_per_pack-
age_bands:
    for distance_from_origin_band in distance_from_origin_
bands:
        locations=get_mtl_location_near_origin(mtl_origin, dis-
tance_from_origin_band)
# Apply the filters
for teams_band in teams_bands:
  for uiia_band in uiia_bands:
    for pups_band in pups_bands:
      for chains_band in chains_bands:
        for hours_between_mtl_band in max_hours_be-
            tween_mtl_bands:
          filters['locations']=locations
          filters['max_hours_between_mtls']=hours_be-
              tween_mtl_band
          filters['pups']=pups_band
          filters['uiia']=uiia_band
          filters['team']=teams_band
          filters['chains']=chains_band
          filters['min_miles_per_package]=min_miles_per_
              package_band
          filters[source]=source_band
          create_packages(filters)
```

As an example, as shown in the pseudocode above, the auto packager module 206 may select a subset of MTLs from the pool of unassigned MTLs to create a particular package. Each MTL in the package may have a particular origin, a start time, an end time, a particular destination, and possible factors/restrictions associated with the MTL such as UIIA, Team, Chains, etc. As example of a pool of MTLs is shown in the table below. In a first step through the pseudocode associated with the auto packager module 206, a first MTL may be selected as the "best" MTL for the package. Then, in a next step through the pseudocode, a second MTL may be selected as the next "best" MTL for the package. An MTL is selected as a "best" MTL based on a number of miles of the MTL as compared with the minimum miles for the package, a distance from the origin, a number of hours between the MTL and a next MTL, and the factors/restrictions associated with the MTL. As an example, the MTL may have to be a Team MTL and only Team MTLs may be selected as a "best" MTL. All other MTLs may be excluded from selection. As another example, the MTL may have to have chains and only chain MTLs may be selected as a "best" MTL. All other MTLs may be excluded from selection. This may continue until the package is complete, e.g., the package has at least the minimum number of miles such as 5,000 miles. Each MTL may be selected based on a minimum number of miles for the package, a distance from the origin, a number of hours between MTLs and others. This is further described in an example below.

TABLE 1

Example Pool of MTLs

| ID | Origin | Start | Destination | End | Is Team | Mileage |
|---|---|---|---|---|---|---|
| 1 | A | 00:00 | B | 01:00 | True | 1000 |
| 2 | A | 01:00 | C | 03:00 | False | 1000 |

TABLE 1-continued

Example Pool of MTLs

| ID | Origin | Start | Destination | End | Is Team | Mileage |
|---|---|---|---|---|---|---|
| 3 | B | 05:00 | C | 06:00 | True | 1000 |
| 4 | B | 03:00 | C | 04:00 | False | 1000 |
| 5 | D | 06:00 | E | 07:00 | True | 1000 |
| 6 | C | 05:00 | D | 07:00 | False | 1000 |
| 7 | B | 10:00 | C | 11:00 | True | 1000 |

The auto packager module 206 initially sorts all the MTLs by their start date. The auto packager module 206 then iterates over each criterion in each band and then evaluates each MTL for matching the criteria.

Example:
Initial Parameter Values
Minimum Miles Per Package=3000
Distance from Origin=35
Maximum Hours Between MTLs=4
Team=Required Since there is no previous MTL to evaluate the auto packager module 206 chooses MTL #1 to start.

The auto packager module 206 iterates over each MTL and compares the candidate MTLs to the reference MTL. When the auto packager module 206 first runs, there is no reference MTL so the first MTL in the list becomes the reference MTL.

A) The auto packager module 206 evaluates origin and destinations for compatibility. The list of next best candidate MTLs is [2, 3, 4, 5, 6].

1) #1's destination is more than 35 miles from #2's origin so the auto packager module 206 removes #2 from the list of candidate MTLs. The list of candidate MTLs is [3, 4, 5, 6, 7].

2) #1's destination is less than 35 miles from #3's origin so the auto packager module 206 keeps #3 in the candidate list. The list of candidate MTLs is [3, 4, 5, 6, 7].

3) #1's destination is less than 35 miles from #4's origin so the auto packager module 206 keeps #3 in the candidate list. The list of candidate MTLs is [3, 4, 5, 6, 7].

4) The auto packager module 206 continues this evaluation for the remaining MTLs in the candidate set. In this example, the auto packager module 206 ends up with a candidate set of [3, 4, 7].

B) The auto packager module 206 evaluates the Team filter of [3, 4, 7]. Teams are required.

1) #3 is a team. The candidate set is [3, 4, 7].
2) #4 is not a team. The candidate set is [3, 7].
3) #7 is a team. The candidate set is [3, 7].

C) The auto packager module 206 evaluates the maximum hours between MTLs.

1) #1's end time is 01:00 and #3's start time is 05:00 which is a difference of 4 hours. The maximum hours between MTLs is 4 hours. The candidate set is [3, 7].

2) #1's end time is 01:00 and #3's start time is 10:00 which is a difference of 6 hours. The maximum hours between MTLs is 4 hours. The candidate set is [3].

D) The auto packager module 206 evaluates the entire package for minimum mileage requirements.

1) The package contains MTLs [1, 3], and their combined mileage is 2000 miles. The minimum mileage per package is 3000. 2000 is less than 3000, so the package is not valid.

2) The system puts MTLs [1, 3] back into the candidate pool.

E) The entire process starts over again starting with MTL #2.

The packager application 114 also includes an approver module 208 for presenting a user with a list of unapproved packages generated by the auto packager module 206. The approver module 208 may be a web application that may be displayed on the display 120 by the browser 124 of the client computing device 104. As an example, the user may review each of the MTLs within each unapproved package and may select and approve each package individually or in a batch process. In addition, the user may delete packages. When the user deletes a package, each of the MTLs associated with the package may be inserted back into the pool of unassigned MTLs.

In one example, the approver module 208 may present each of the MTLs in a package as a row in a table. Each row may include information such as an MTL identifier, an MTL source (e.g., a name of a file including legs curated by a user or a name of a file having legs selected by a computing device), an origin, a destination, a start time, an end time, an amount of time for the MTL (e.g., the delta between the start time and the end time), a down time between the MTL and a previous MTL, double trailer requirements for the MTL, chain requirements for the MTL, UIIA requirements for the MTL, and team requirements for the MTL. The user may remove an individual MTL from a particular package. In addition, each package may include a total number of miles associated with the package and requirements associated with the package as a mechanism to understand the rules that were used to assemble the package.

The packager application 114 further includes an exporter module 210 for exporting reports for packages, MTLs, and legs. The exporter module 210 may be a web application that may be displayed on the display 120 by the browser 124 of the client computing device 104. The exporter module 210 may be used to generate HTML reports to be displayed by the browser 124, generate CSV files, or generate another type of file.

In addition, the packager application 114 includes a user interface module 212 for displaying a user interface on the display 120. As an example, the user interface module 212 generates a native and/or web-based graphical user interface (GUI) that accepts input and provides output viewed by users of the client computing device 104. The client computing device 104 may provide realtime information automatically and dynamically refreshed package information. The user interface module 212 may send data to other modules of the packager application 114 of the server computing device 102, and retrieve data from other modules of the packager application of the server computing device 102 asynchronously without interfering with the display and behavior of the user interface displayed by the browser 124 of the client computing device 104.

Figure 3:
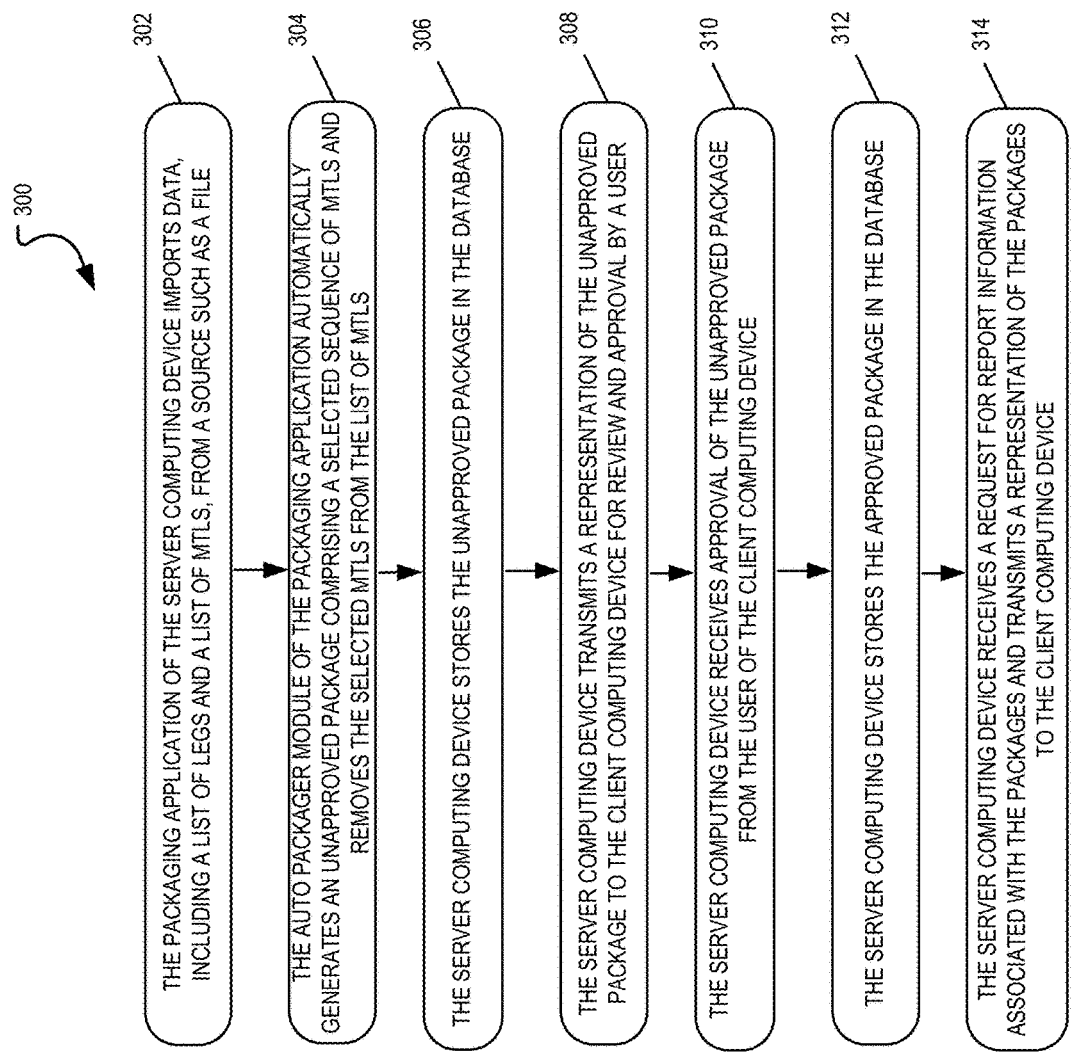
FIG. 3 illustrates a flowchart for generating logistics packages according to an example embodiment.

FIG. 3 illustrates a flowchart of a process 300 for generating logistics packages according to an example embodiment. In step 302, the data importer module 204 of the packager application 114 executed by the server computing device 102 imports and ingests data including a list of legs and a list of MTLs from a source. In one example, the source may include one or more fixed-width files. The data importer module 204 may create a row in a table of the database 112 for each of the legs and each of the MTLs as they are imported.

Next, in step 304, the auto packager module 206 of the packager application 114 automatically generates an unapproved package comprising a selected sequence of MTLs and removes the selected MTLs from the list of MTLs. The auto packager module 206 may select a first MTL as a best MTL and continue to select a next MTL as a next "best" MTL for the sequence. The MTL may be selected based on the rules and factors such as (1) a number of total miles for the package, (2) a distance between a destination of a first MTL and an origin of a second MTL, (3) an amount of time between the first MTL and the second MTL, (4) team preferences, (5) double trailer preferences, (6) chain preferences, (7) UIIA preferences, and other rules/factors.

As an example, the auto packager module 206 initially sorts all the MTLs by their start date. The auto packager module 206 then iterates over each criterion in each band and then evaluates each MTL for matching the criteria. The following example is based on Table 1, above.

Example:
Initial Parameter Values
Minimum Miles Per Package=3000
Distance from Origin=35
Maximum Hours Between MTLs=4
Team=Required Since there is no previous MTL to evaluate the auto packager module 206 chooses MTL #1 to start.

The auto packager module 206 iterates over each MTL and compares the candidate MTLs to the reference MTL. When the auto packager module 206 first runs, there is no reference MTL so the first MTL in the list becomes the reference MTL.

A) The auto packager module 206 evaluates origin and destinations for compatibility. The list of next best candidate MTLs is [2, 3, 4, 5, 6].

1) #1's destination is more than 35 miles from #2's origin so the auto packager module 206 removes #2 from the list of candidate MTLs. The list of candidate MTLs is [3, 4, 5, 6, 7].

2) #1's destination is less than 35 miles from #3's origin so the auto packager module 206 keeps #3 in the candidate list. The list of candidate MTLs is [3, 4, 5, 6, 7].

3) #1's destination is less than 35 miles from #4's origin so the auto packager module 206 keeps #3 in the candidate list. The list of candidate MTLs is [3, 4, 5, 6, 7].

4) The auto packager module 206 continues this evaluation for the remaining MTLs in the candidate set. In this example, the auto packager module 206 ends up with a candidate set of [3, 4, 7].

B) The auto packager module 206 evaluates the Team filter of [3, 4, 7]. Teams are required.

1) #3 is a team. The candidate set is [3, 4, 7].

2) #4 is not a team. The candidate set is [3, 7].

3) #7 is a team. The candidate set is [3, 7].

C) The auto packager module 206 evaluates the maximum hours between MTLs.

1) #1's end time is 01:00 and #3's start time is 05:00 which is a difference of 4 hours. The maximum hours between MTLs is 4 hours. The candidate set is [3, 7].

2) #1's end time is 01:00 and #3's start time is 10:00 which is a difference of 6 hours. The maximum hours between MTLs is 4 hours. The candidate set is [3].

D) The auto packager module 206 evaluates the entire package for minimum mileage requirements.

1) The package contains MTLs [1, 3], and their combined mileage is 2000 miles. The minimum mileage per package is 3000. 2000 is less than 3000, so the package is not valid.

2) The system puts MTLs [1, 3] back into the candidate pool.

E) The entire process starts over again starting with MTL #2.

There are a very large number of factors that the system automatically processes and evaluates against a plurality of rules. With the filtering options discussed herein, rules can be adjusted by a user for further automatic evaluation and selection by the system.

As an example, factors can be associated with a type of freight being transported, a type of driver/operator operating the motor vehicle, service parameters of the freight, requirements of the loading origin and the unloading destination of the freight, roadways to be travelled during transportation of the freight, and others.

Other factors may be associated with distances between a destination of one MTL and an origin of a next MTL, an amount of time between MTLs, leg attributes/requirements (e.g., chains required, tolls on roads, double trailers, and location specific requirements (e.g., such as whether or not the location requires Uniform Intermodal Interchange and Facilities Access Agreement (UIIA), Transportation Work Identification Credential (TWIC), pallet exchange, driver assist, tarp, drop trailer, security seals, and other logistics requirements)).

As an example, if the freight is perishable such as frozen foods, the system may mandate that only vehicles with an insulated and temperature control trailer be selected for evaluation. If it is determined that the freight is classified as "deep" frozen, (e.g., below ten degrees Fahrenheit) for freight such as ice cream or other frozen foods, then the system may mandate that only "deep" frozen vehicles be selected for evaluation. As another example, certain types of freight may be classified by the USDOT as hazardous materials. In these cases, only certain drivers with a hazardous materials certification may be selected. The system may automatically apply rules to each of the factors associated with each MTL as it evaluates, selects, sequences, and then combines individual MTLs together into a package of MTLs. If an MTL to be packaged includes a leg segment during the winter months where a state department of transportation may only allow trucks having tire chains for safety purposes, then the system may only select a motor carrier vehicle equipped with tire chains for the particular package.

Next, in step 306, the server computing device 102 may store the unapproved package including the selected sequence of MTLs in the database 112. In step 308, the server computing device 108 may transmit a representation of the unapproved package to the client computing device 104 for approval by a user of the client computing device. The user may view and approve the unapproved package using the browser 124 of the client computing device 104. If the user approves the unapproved package, then the client computing device 104 may transmit the approval to the server computing device 102 and in step 310, the server computing device may receive the approval from the user of the client computing device 104. The user of the client computing device 104 may approve one or more packages at a time and may also delete a package. If a package is deleted, any MTLs may be added back to the pool of unselected MTLs. In step 312, the server computing device 104 may store the approved package in the database 112 with other approved packages. The server computing device 102 may continue to generate unapproved packages including other MTLs that were not chosen in previous packages and request and receive approval from the user of the client computing device 104.

In step 314, the server computing device 102 may receive a request for report information associated with the packages from the client computing device 104. The server computing device 102 may transmit a representation of the packages to the client computing device 104. The user may view the report information using the browser 124 of the client computing device 104. The report information may be displayed as HTML on the display 120 of the client computing device 104. Alternatively, the report information may be downloaded as a CSV file or another type of file. The user may view a variety of report information such as a list of approved packages, a list of unapproved packages, all MTLs, invalid MTLs, all legs, and legs with more than a user defined amount of down time. The user also may view other types of report information.

Figure 4:
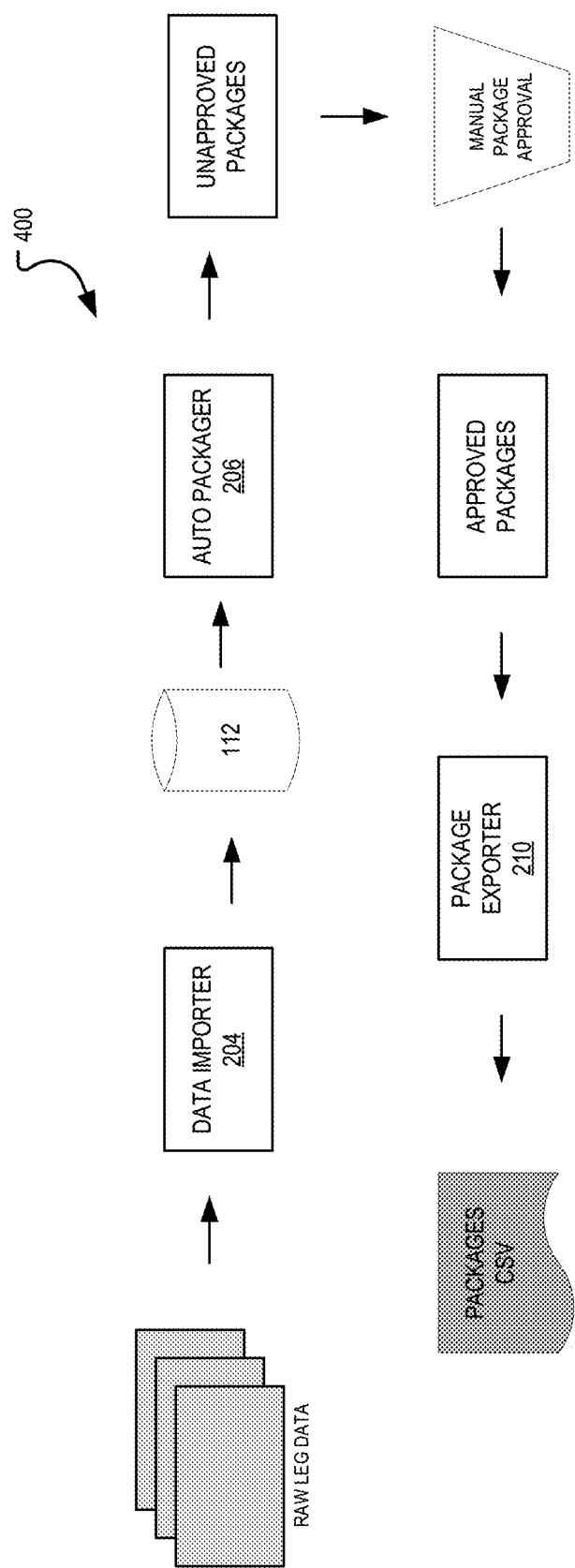
FIGS. 4 and 5 illustrate flow diagrams for generating logistics packages according to an example embodiment.
Figure 5:
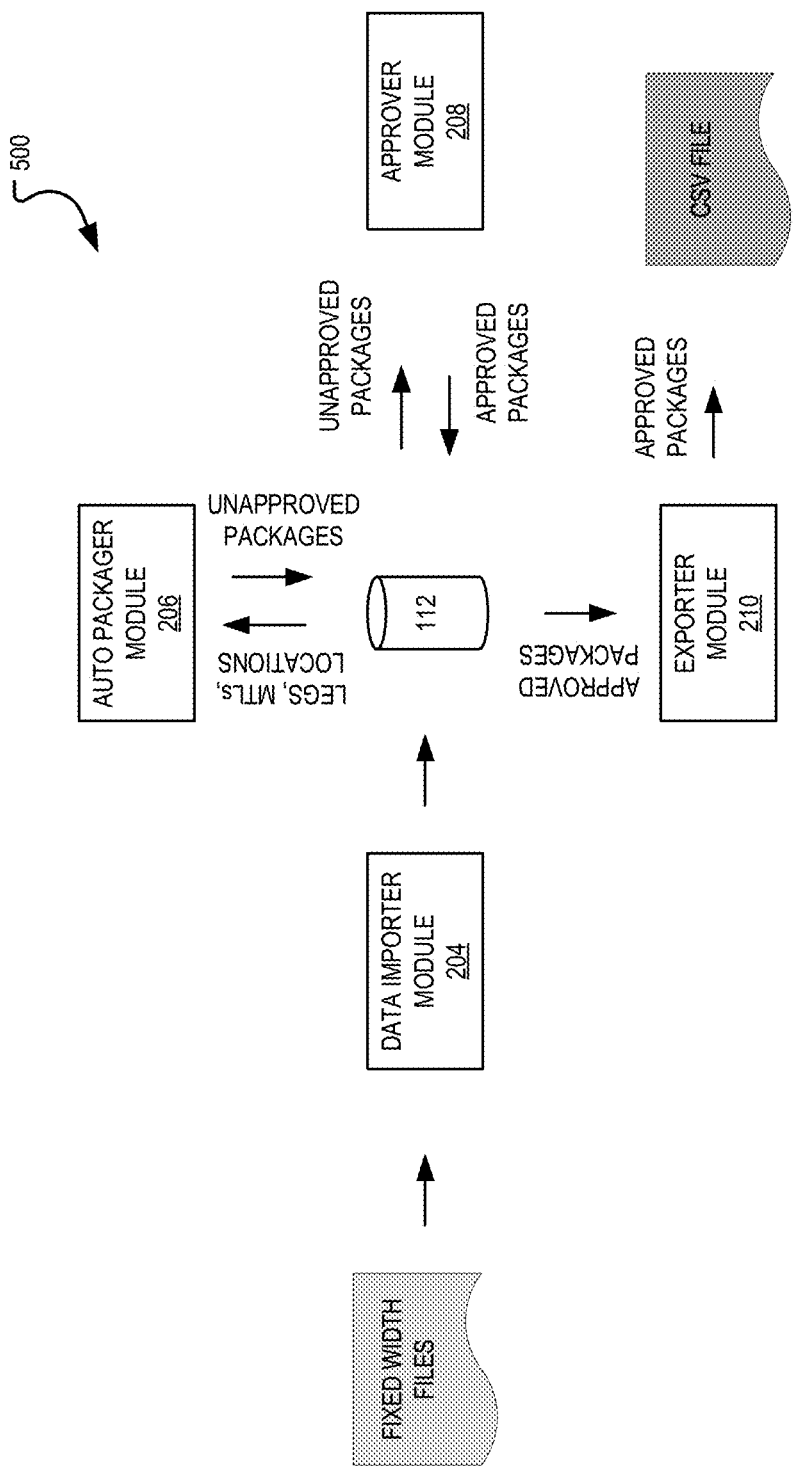

FIGS. 4 and 5 illustrate example flow diagrams 400 and 500 for generating logistics packages according to an example embodiment. As shown in FIGS. 4 and 5, the data importer module 204 may receive raw leg data and ingest data including a list of legs and a list of MTLs from a source. The data importer module 204 may create a row in a table of the database 112 for each of the legs and each of the MTLs as they are imported. The auto packager module 206 of the packager application 114 automatically generates an unapproved package comprising a selected sequence of MTLs and removes the selected MTLs from the list of MTLs. Unapproved packages may be manually approved by the user of the client computing device. The user may view and approve the unapproved package using the browser 124 of the client computing device 104. Approved packages may be sent to the exporter module 210. The exporter module 210 may be used to generate HTML reports to be displayed by the browser 124, generate CSV files, or generate another type of file.

Figure 6:

FIG. 6 shows an example screenshot 600 provided by the approver module 208 of the packager application 114 according to an example embodiment. In one example, the display 120 of the client computing device 104 displays the screenshot 600 shown in FIG. 6 in the browser 124. FIG. 6 shows three different unapproved packages that are displayed for review and approval by the user. FIG. 6 shows a "Package #149" 602, a "Package #150" 604 and a "Package #151" 606.

The Package #149 may include five different MTLs including a first MTL of 854 miles that has an origin of San Bruno, Calif., a second MTL of 1,170 miles that has an origin of Sacramento, Calif., a third MTL of 1,170 miles that has an origin of Sacramento, Calif., a fourth MTL of 787 miles that has an origin and final destination of Oakland, Calif. The fifth MTL of 906 miles originates in North Bay, Calif. and has a final destination at North Bay, Calif. Each MTL has a shown date and time of driving hours and a time gap between each MTL, which is shown in the user interface. The Package #149 includes a total of 6,455 miles. In addition, as shown in the user interface, the Package #149 includes a plurality of rules and factors that are displayed with column titles such as Pups, Chains, UIIA and Team. Many more factors may be introduced by the user such as Hazardous Materials, Required Trailer Types (Refrigerated, Insulated, Flat Bed, etc.), Driver load or unload assist, and many other factors that the system 100 may need to automatically evaluate in order to produce packages that comply with the rules and factors.

The Package #150 may include eleven different MTLs including a first MTL of 3,403 miles that has an origin of Oakland, Calif., a second MTL of 823 miles that has an origin of Oakland, Calif., a third MTL of 787 miles that has an origin of Oakland, Calif., a fourth MTL of 1,282 miles that has an origin of Oakland, Calif., a fifth MTL of 823 miles that has an origin of Oakland, Calif., a sixth MTL of 787 miles that has an origin of Oakland, Calif., a seventh MTL of 823 miles that has an origin of Oakland, Calif., an eighth MTL of 5,136 miles that has an origin of Oakland, Calif., a ninth MTL of 1,610 miles that has an origin of Sacramento, Calif., a tenth MTL of 769 miles that has an origin of Oakland, Calif., and an eleventh MTL of 784 miles that has an origin of San Bruno, Calif. The Package #150 includes a total of 17,029 miles.

The Package #151 may include ten different MTLs including a first MTL of 3,403 miles with an origin of Oakland, Calif., a second MTL of 1,610 miles that has an origin of Sacramento, Calif., a third MTL of 1,466 miles with an origin of Oakland, Calif., a fourth MTL of 1,244 miles with an origin of North Bay, Calif., a fifth MTL of 3,403 miles with an origin of Oakland, Calif., a sixth MTL of 1,282 miles with an origin of Oakland, Calif., a seventh MTL of 5,519 miles with an origin of Oakland, Calif., an eighth MTL of 1,621 miles with an origin of San Bruno, Calif., a ninth MTL of 1,282 miles with an origin of Oakland, Calif., and a tenth MTL of 1,507 miles with an origin of Sacramento, Calif. The Package #151 includes a total of 22,337 miles.

As shown in FIG. 6, the user may select one of the buttons 608 displayed such as "Select All Packages," "Unselect All Packages," "Approve Selected Packages," and "Delete Selected Packages" in addition to optionally selecting a user interface element such as the radio buttons associated with each package and an operation is performed such as approval of the selected packages. When the operation is performed, the client computing device 104 transmits the approval to the server computing device 102 and the server computing device 102 stores information about the approval of the packages in the database 112.

FIG. 7 shows an example user interface associated with the exporter module 210 of the packager application 114 according to an example embodiment. In one example, the display 120 of the client computing device 104 displays reports information in the browser 124 or in another application. FIG. 7 shows user interface elements that may be used to generate reports information and the user may select different available links 702 or buttons to review approved packages, unapproved packages, all MTLs, invalid MTLs, all legs/load segments, and legs/load segments having a user specified hours of down time. Other reporting options are possible.

FIG. 8 illustrates an example computing system 800 that may implement various systems, such as the server computing device 102 and the client computing device 104, and the methods discussed herein, such as process 300. A general purpose computer system 800 is capable of executing a computer program product to execute a computer process. Data and program files may be input to the computer system 800, which reads the files and executes the programs therein such as the packager application 114 and the browser 124. Some of the elements of a general purpose computer system 800 are shown in FIG. 8 wherein a processor 802 is shown having an input/output (I/O) section 804, a central processing unit (CPU) 806, and a memory section 808. There may be one or more processors 802, such that the processor 802 of the computer system 800 comprises a single central-processing unit 806, or a plurality of processing units, commonly referred to as a parallel processing environment. The computer system 800 may be a conventional computer, a server, a distributed computer, or any other type of computer, such as one or more external computers made available via a cloud computing architecture. The presently described technology is optionally implemented in software devices loaded in memory 808, stored on a configured DVD/CD-ROM 810 or storage unit 812, and/or communicated via a wired or wireless network link 814, thereby transforming the computer system 800 in FIG. 8 to a special purpose machine for implementing the described operations.

The memory section 808 may be volatile media, nonvolatile media, removable media, non-removable media, and/or other media or mediums that can be accessed by a general purpose or special purpose computing device. For example, the memory section 808 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 804 is connected to one or more user-interface devices (e.g., a keyboard 816 and a display unit 818), a disc storage unit 812, and a disc drive unit 820. Generally, the disc drive unit 820 is a DVD/CD-ROM drive unit capable of reading the DVD/CD-ROM medium 810, which typically contains programs and data 822. Computer program products containing mechanisms to effectuate the systems and methods in accordance with the presently described technology may reside in the memory section 804, on a disc storage unit 812, on the DVD/CD-ROM medium 810 of the computer system 800, or on external storage devices made available via a cloud computing architecture with such computer program products, including one or more database management products, web server products, application server products, and/or other additional software components. Alternatively, a disc drive unit 820 may be replaced or supplemented by a tape drive unit, or other storage medium drive unit. The network adapter 824 is capable of connecting the computer system 800 to a network via the network link 814, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 800 is connected (by wired connection and/or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are examples of communications devices for and other means of establishing a communications link between the computers may be used.

In an example implementation, source code executed by the server computing device 102 or the client computing device 104, a plurality of internal and external databases, source databases, and/or cached data on servers are stored in the database 112, memory 110 of the server computing device 102, memory 118 of the client computing device 104, or other storage systems, such as the disk storage unit 812 or the DVD/CD-ROM medium 810, and/or other external storage devices made available and accessible via a network architecture. The source code executed by the server computing device 102 and the client computing device 104 may be embodied by instructions stored on such storage systems and executed by the processor 802.

Some or all of the operations described herein may be performed by the processor 802, which is hardware. Further, local computing systems, remote data sources and/or services, and other associated logic represent firmware, hardware, and/or software configured to control operations of the logistics packager system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 802 and a user may interact with a Graphical User Interface (GUI) using one or more user-interface devices (e.g., the keyboard 816, the display unit 818, and the user devices 804) with some of the data in use directly coming from online sources and data stores. The system set forth in FIG. 8 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:

a memory; and at least one processor to:

import data from a source by a data importer module that executes from a command line and determines whether there is at least one file in a particular directory, the data importer module processing the at least one file in the particular directory, the data comprising routing information between each zip code in the United States, a list of legs, and a list of at least tens of thousands of multi-leg truck loads (MTLs), each leg comprising a trip from an origin to a destination and each MTL comprising at least one leg, the list of MTLs including at least one MTL, each MTL having an origin, a destination, a start time, an end time, and a number of miles, determine a latitude and a longitude for each origin and each destination by obtaining the latitude and the longitude from one of a file and a server computing device;

continually receive, by the data importer module, additional MTLs;

continually and automatically generate a plurality of unapproved packages as the additional MTLs are received by an auto packager module that establishes filtering bands that determine a next best MTL to be inserted into each unapproved package one MTL at a time by simultaneously iterating over a plurality of nested loops over each MTL in the list of MTLs using a first array that defines a minimum number of miles for the unapproved package, a second array that defines a maximum distance from an origin for a next MTL, a third array that defines a maximum number of hours between each MTL, a fourth array that defines whether each MTL can be operated by a team, a fifth array that defines whether the MTL can have a pup trailer, a sixth array that defines whether the MTL can use chains, and a seventh array that defines whether the MTL can have Uniform Intermodal Interchange and Facilities Access Agreement (UIIA), the unapproved package comprising a sequence of MTLs selected and removed from the list of MTLs based on the first array, the second array, the third array, the fourth array, the fifth array, the sixth array, the seventh array, the latitude and longitude for each origin and each destination, each MTL added to the sequence of MTLs having an origin closest to a previous MTL destination to reduce empty miles traveled, the unapproved package based on operator preferences associated with team operation, trailer preferences, chain preferences, and Uniform Intermodal Interchange and Facilities Access Agreement (UIIA) preferences, the auto packager module first applying more restrictive rules for each array and loosening the rules while iterating over each array to increase a likelihood of selecting the next best MTL for each unapproved package;

store, by the auto packager module, each unapproved package in a database;

transmit, by a web approver application, each unapproved package to a particular client computing device associated with a unique package identifier having an approver module for approval;

transmit, by the web approver application, to the particular client computing device, a graphical user interface (GUI) that dynamically displays realtime package information including the sequence of MTLs included in each unapproved package;

display, by the particular client computing device, the sequence of MTLs included in each unapproved package and display for each leg in each unapproved package a leg number, an MTL ID, an origin, an origin date, an origin time, a destination date, a drive time, a time gap, a number of miles, a type of trailer, chain information, UIIA information, and team information, and display by the particular client computing device a selectable user interface element for each unapproved package;

receive, by the particular client computing device, an indication of approval for each unapproved package based on selection of the selectable user interface element;

receive, by an approver module, the approval of each unapproved package from the client computing device and store each unapproved package as an approved package in the database; and obtain from the database, by an exporter module, and send a report to the at least one client computing device, the report having the leg number, the MTL ID, the origin, the origin date, the origin time, the destination date, the drive time, the time gap, the number of miles, the type of trailer, the chain information, the UIIA information, and the team information.

2. The system of claim 1, the at least one processor further to generate the sequence of MTLs having a first MTL followed by a second MTL.

3. The system of claim 1, the at least one processor further to automatically generate the unapproved package to have at least one of a minimum number of miles, a maximum number of miles between each MTL destination and each MTL origin, and a particular down time between each MTL.

4. The system of claim 1, the at least one processor further to export a list of approved packages to the client computing device.

5. The system of claim 1, the at least one processor further to export a list of approved packages to the client computing device as one of hypertext markup language (HTML) and a comma-separated values file.

6. A method comprising:

importing, by a processor, data from a source, by a data importer module that executes from a command line and determines whether there is at least one file in a particular directory, the data importer module processing the at least one file in the particular directory, the data comprising routing information between each zip code in the United States, a list of legs, and a list of at least tens of thousands of multi-leg truck loads (MTLs), each leg comprising a trip from an origin to a destination and each MTL comprising at least one leg, the list of MTLs including at least one MTL, each MTL having an origin, a destination, a start time, an end time, and a number of miles, determine a latitude and a longitude for each origin and each destination by obtaining the latitude and the longitude from one of a file and a server computing device;

continually receiving, by the processor and the data importer module, additional MTLs;

continually and automatically generating, by the processor and the data importer module, a plurality of unapproved packages as the additional MTLs are received by an auto packager module that establishes filtering bands that determine a next best MTL to be inserted into each unapproved package one MTL at a time by simultaneously iterating over a plurality of nested loops over each MTL in the list of MTLs using a first array that defines a minimum number of miles for the unapproved package, a second array that defines a maximum distance from an origin for a next MTL, a third array that defines a maximum number of hours between each MTL, a fourth array that defines whether each MTL can be operated by a team, a fifth array that defines whether the MTL can have a pup trailer, a sixth array that defines whether the MTL can use chains, and a seventh array that defines whether the MTL can have Uniform Intermodal Interchange and Facilities Access Agreement (UIIA), the unapproved package comprising a sequence of MTLs selected and removed from the list of MTLs based on the latitude and longitude for each origin and each destination, each MTL added to the sequence of MTLs having an origin closest to a previous MTL destination to reduce empty miles traveled, the unapproved package based on operator preferences associated with team operation, trailer preferences, chain preferences, and Uniform Intermodal Interchange and Facilities Access Agreement (UIIA) preferences, the auto packager module first applying more restrictive rules for each array and loosening the rules while iterating over each array to increase a likelihood of selecting the next best MTL for each unapproved package;

storing, by the processor and by the auto packager module, the unapproved package in a database;

transmitting, by the processor and a web approver application, each unapproved package to a particular client computing device associated with a unique package identifier having an approver module for approval;

transmitting, by the processor and the web approver application, to the particular client computing device, a graphical user interface (GUI) that dynamically displays realtime package information including the sequence of MTLs included in each unapproved package;

displaying, by the particular client computing device, the sequence of MTLs included in each unapproved package and displaying for each leg in each unapproved package a leg number, an MTL ID, an origin, an origin date, an origin time, a destination date, a drive time, a time gap, a number of miles, a type of trailer, chain information, UIIA information, and team information, and displaying by the particular client computing device a selectable user interface element for each unapproved package;

receiving, by the particular client computing device, an indication of approval for each unapproved package based on selection of the selectable user interface element; and receiving, by the processor and an approver module, the approval of each unapproved package from the client computing device and storing each unapproved package as an approved package in the database; and obtaining from the database, by the processor and an exporter module, and sending a report to the at least one client computing device, the report having the leg number, the MTL ID, the origin, the origin date, the origin time, the destination date, the drive time, the time gap, the number of miles, the type of trailer, the chain information, the UIIA information, and the team information.

7. The method of claim 6, further comprising generating the sequence of MTLs having a first MTL followed by a second MTL.

8. The method of claim 6, further comprising automatically generating the unapproved package to have at least one of a minimum number of miles, a maximum number of miles between each MTL destination and each MTL origin, and a particular down time between each MTL.

9. The method of claim 6, further comprising exporting a list of approved packages to the client computing device.

10. The method of claim 6, further comprising exporting a list of approved packages to the client computing device as one of hypertext markup language (HTML) and a comma-separated values file.

11. A non-transitory computer-readable storage medium, having instructions stored thereon that, when executed by a computing device cause the computing device to perform operations, the operations comprising:

importing data from a source, by a data importer module that executes from a command line and determines whether there is at least one file in a particular directory, the data importer module processing the at least one file in the particular directory, the data comprising routing information between each zip code in the United States, a list of legs, and a list of at least tens of thousands of multi-leg truck loads (MTLs), each leg comprising a trip from an origin to a destination and each MTL comprising at least one leg, the list of MTLs including at least one MTL, each MTL having an origin, a destination, a start time, an end time, and a number of miles, determine a latitude and a longitude for each origin and each destination by obtaining the latitude and the longitude from one of a file and a server computing device;

continually receiving, by the data importer module, additional MTLs;

continually and automatically generating a plurality of unapproved packages as the additional MTLs are received by an auto packager module that establishes filtering bands that determine a next best MTL to be inserted into each unapproved package one MTL at a time by simultaneously iterating over a plurality of nested loops over each MTL in the list of MTLs using a first array that defines a minimum number of miles for the unapproved package, a second array that defines a maximum distance from an origin for a next MTL, a third array that defines a maximum number of hours between each MTL, a fourth array that defines whether each MTL can be operated by a team, a fifth array that defines whether the MTL can have a pup trailer, a sixth array that defines whether the MTL can use chains, and a seventh array that defines whether the MTL can have Uniform Intermodal Interchange and Facilities Access Agreement (UIIA), the unapproved package comprising a sequence of MTLs selected and removed from the list of MTLs based on the latitude and longitude for each origin and each destination, each MTL added to the sequence of MTLs having an origin closest to a previous MTL destination to reduce empty miles traveled, the unapproved package based on operator preferences associated with team operation, trailer preferences, chain preferences, and Uniform Intermodal Interchange and Facilities Access Agreement (UIIA) preferences, the auto packager module first applying more restrictive rules for each array and loosening the rules while iterating over each array to increase a likelihood of selecting the next best MTL for each unapproved package;

storing, by the auto packager module, each unapproved package in a database;

transmitting, by a web approver application, each unapproved package to a particular client computing device associated with a unique package identifier having an approver module for approval;

transmitting, by the web approver application, to the particular client computing device, a graphical user interface (GUI) that dynamically displays realtime package information including the sequence of MTLs included in each unapproved package;

displaying, by the particular client computing device, the sequence of MTLs included in each unapproved package and displaying for each leg in each unapproved package a leg number, an MTL ID, an origin, an origin date, an origin time, a destination date, a drive time, a time gap, a number of miles, a type of trailer, chain information, UIIA information, and team information, and displaying by the particular client computing device a selectable user interface element for each unapproved package;

receiving, by the particular client computing device, an indication of approval for each unapproved package based on selection of the selectable user interface element;

receiving, by the approver module, the approval of each unapproved package from the client computing device and storing each unapproved package as an approved package in the database; and obtaining from the database, by an exporter module, and sending a report to the at least one client computing device, the report having the leg number, the MTL ID, the origin, the origin date, the origin time, the destination date, the drive time, the time gap, the number of miles, the type of trailer, the chain information, the UIIA information, and the team information.

12. The non-transitory computer-readable storage medium of claim 11, the operations further comprising generating the sequence of MTLs having a first MTL followed by a second MTL.

13. The non-transitory computer-readable storage medium of claim 11, the operations further comprising automatically generating the unapproved package to have at least one of a minimum number of miles, a maximum number of miles between each MTL destination and each MTL origin, and a particular down time between each MTL.

14. The non-transitory computer-readable storage medium of claim 11, the operations further comprising exporting a list of approved packages to the client computing device.

15. The non-transitory computer-readable storage medium of claim 11, the operations further comprising exporting a list of approved packages to the client computing device as one of hypertext markup language (HTML) and a comma-separated values file.

\* \* \* \* \*